(12) United States Patent
Mundt et al.

(10) Patent No.: US 11,438,244 B2
(45) Date of Patent: Sep. 6, 2022

(54) SYSTEM AND METHOD TO MONITOR USAGE OF INFORMATION HANDLING SYSTEM USING BASEBOARD MANAGEMENT CONTROLLER

(71) Applicant: Dell Products L.P., Round Rock, TX (US)

(72) Inventors: Kevin Warren Mundt, Austin, TX (US); Juan R. Vega, Round Rock, TX (US); Jon Robert Hass, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 60 days.

(21) Appl. No.: 16/655,525

(22) Filed: Oct. 17, 2019

(65) Prior Publication Data

US 2021/0119891 A1    Apr. 22, 2021

(51) Int. Cl.
*H04L 43/065* (2022.01)
*H04L 43/16* (2022.01)
*H04L 43/0829* (2022.01)

(52) U.S. Cl.
CPC ........ *H04L 43/065* (2013.01); *H04L 43/0829* (2013.01); *H04L 43/16* (2013.01)

(58) Field of Classification Search
CPC .... H04L 43/065; H04L 43/16; H04L 43/0829
See application file for complete search history.

(56) References Cited

U.S. PATENT DOCUMENTS

| 2016/0014073 A1* | 1/2016 | Reddy | H04L 41/048 713/2 |
| 2017/0003984 A1* | 1/2017 | Gatson | G06F 9/44505 |

FOREIGN PATENT DOCUMENTS

WO    WO-2017023237 A1 *   2/2017   ........... G06F 9/5077

\* cited by examiner

*Primary Examiner* — Yaotang Wang
(74) *Attorney, Agent, or Firm* — Baker Botts L.L.P.

(57) ABSTRACT

Methods and systems for monitoring, by a baseboard management controller, a network interface of an information handling system, identifying one or more management information exchanges between the information handling system and a plurality of information handling systems, identifying one or more telemetry metrics associated with the one or more management information exchanges on a hardware level, storing the one or more telemetry metrics into a telemetry metrics database of the information handling system, transmitting a telemetry metrics report including the one or more telemetry metrics to a service provider for analysis, analyzing, by the service provider, the telemetry metrics report to indicate a percent usage of an overall usage capacity associated with each device of a plurality of devices of the information handling system, and transmitting a usage report to each of the plurality of information handling systems based on the analysis of the telemetry metrics report.

18 Claims, 3 Drawing Sheets

SYSTEM AND METHOD TO MONITOR USAGE OF INFORMATION HANDLING SYSTEM USING BASEBOARD MANAGEMENT CONTROLLER

BACKGROUND

Field of the Disclosure

This disclosure relates generally to information handling systems, and in particular to monitoring usage of an information handling system using a baseboard management controller.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method for monitoring usage of an information handling system using a baseboard management controller, where the method includes monitoring, by a baseboard management controller (BMC) of an information handling system, a network interface of the information handling system, the network interface communicatively coupled to a plurality of information handling systems via a network; identifying, by the BMC and via the network interface, one or more management information exchanges between the information handling system and each of the plurality of information handling systems via the network; identifying, by the BMC, one or more telemetry metrics associated with the one or more management information exchanges, the BMC identifying the one or more telemetry metrics on a hardware level; storing, by the BMC, the one or more telemetry metrics into a telemetry metrics database of the information handling system; transmitting, by the BMC, a telemetry metrics report to a service provider for analysis, the telemetry metrics report comprised of at least the one or more telemetry metrics; analyzing, by the service provider, the telemetry metrics report, the analysis indicating a percent usage of an overall usage capacity associated with each device of a plurality of devices of the information handling system; and transmitting, by the service provider, a usage report to the plurality of information handling systems, the usage report based on the analysis of the telemetry metrics report.

In one or more of the disclosed embodiments, identifying the one or more telemetry metrics comprises: determining, by the BMC, at least one of: a number of bytes transmitted from the information handling system to each of the plurality of information handling systems via the network interface during the one or more management information exchanges; and a number of bytes received by the information handling system from each of the plurality of information handling systems via the network interface during the one or more management information exchanges.

In one or more of the disclosed embodiments, identifying the one or more telemetry metrics comprises: determining, by the BMC, a number of discarded data packets associated with the one or more management information exchanges, the number of discarded data packets indicating a number of data packets lost due to an electrical interference in the network.

In one or more of the disclosed embodiments, identifying the one or more telemetry metrics comprises: determining, by the BMC, an overall power consumption of the information handling system, the overall power consumption associated with the one or more management information exchanges.

In one or more of the disclosed embodiments, identifying the one or more telemetry metrics comprises: determining, by the BMC, a number of bytes stored in a local storage resource of the information handling system, the number of bytes stored indicating a percentage of an overall storage capacity of the local storage resource that have been used for storage.

In one or more of the disclosed embodiments, identifying the one or more telemetry metrics comprises: determining, by the BMC, a number of processors comprising a processor subsystem of the information handling system, each processor executing a command cycle.

In one or more of the disclosed embodiments, analyzing the telemetry metrics report comprises: determining, by the service provider, whether the percent usage of the overall usage capacity associated with each device of the plurality of devices of the information handling system is below a threshold percentage; and in response to determining that the percent usage of the overall usage capacity associated with a device of the plurality of devices is below the threshold percentage: identifying, by the service provider, a plurality of downgraded devices, each downgraded device having an overall usage capacity less than the overall usage capacity associated with the device of the plurality of devices; and adding, by the service provider, information describing the plurality of downgraded devices to the usage report.

In one or more of the disclosed embodiments, analyzing the telemetry metrics report comprises: determining, by the service provider, whether the percent usage of the overall usage capacity associated with each device of the plurality of devices of the information handling system is above a threshold percentage; and in response to determining that the percent usage of the overall usage capacity associated with a device of the plurality of devices is above the threshold percentage: identifying, by the service provider, a plurality of upgraded devices, each upgraded device having an overall usage capacity greater than the overall usage capacity associated with the device of the plurality of devices; and adding, by the service provider, information describing the plurality of upgraded devices to the usage report.

In one or more of the disclosed embodiments, the method further comprises transmitting, by the service provider, a notification to an administrator of the information handling system, the notification indicating that the percent usage of the overall usage capacity of the device is above the threshold percentage.

In one or more of the disclosed embodiments, the method further comprises determining, by the BMC, whether a BMC interface is communicatively coupled to the service provider; and in response to determining that the BMC interface is not communicatively coupled to the service provider: causing, by the BMC, the information handling system and each of the plurality of information handling systems to communicatively decouple.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR
EMBODIMENT(S)

This document describes a method and a system to monitor usage of an information handling system using a baseboard management controller. Specifically, this document describes monitoring, by a baseboard management controller (BMC) of an information handling system, a network interface of the information handling system, the network interface communicatively coupled to a plurality of information handling systems via a network; identifying, by the BMC and via the network interface, one or more management information exchanges between the information handling system and each of the plurality of information handling systems via the network; identifying, by the BMC, one or more telemetry metrics associated with the one or more management information exchanges, the BMC identifying the one or more telemetry metrics on a hardware level; storing, by the BMC, the one or more telemetry metrics into a telemetry metrics database of the information handling system; transmitting, by the BMC, a telemetry metrics report to a service provider for analysis, the telemetry metrics report comprised of at least the one or more telemetry metrics; analyzing, by the service provider, the telemetry metrics report, the analysis indicating a percent usage of an overall usage capacity associated with each device of a plurality of devices of the information handling system; and transmitting, by the service provider, a usage report to the plurality of information handling systems, the usage report based on the analysis of the telemetry metrics report.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
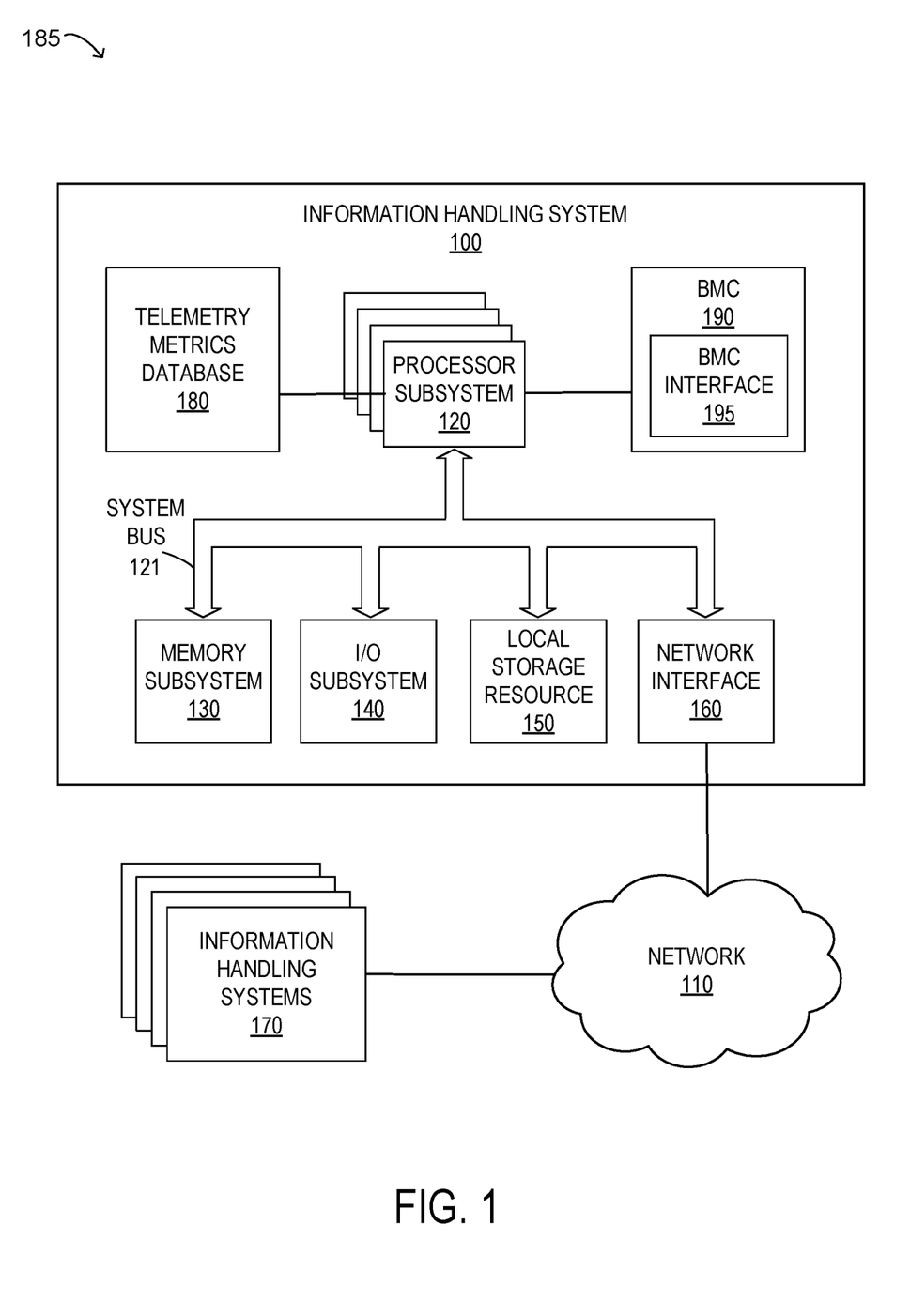
FIG. 1 illustrates a block diagram of selected elements of an embodiment of an information handling system.
Figure 2:
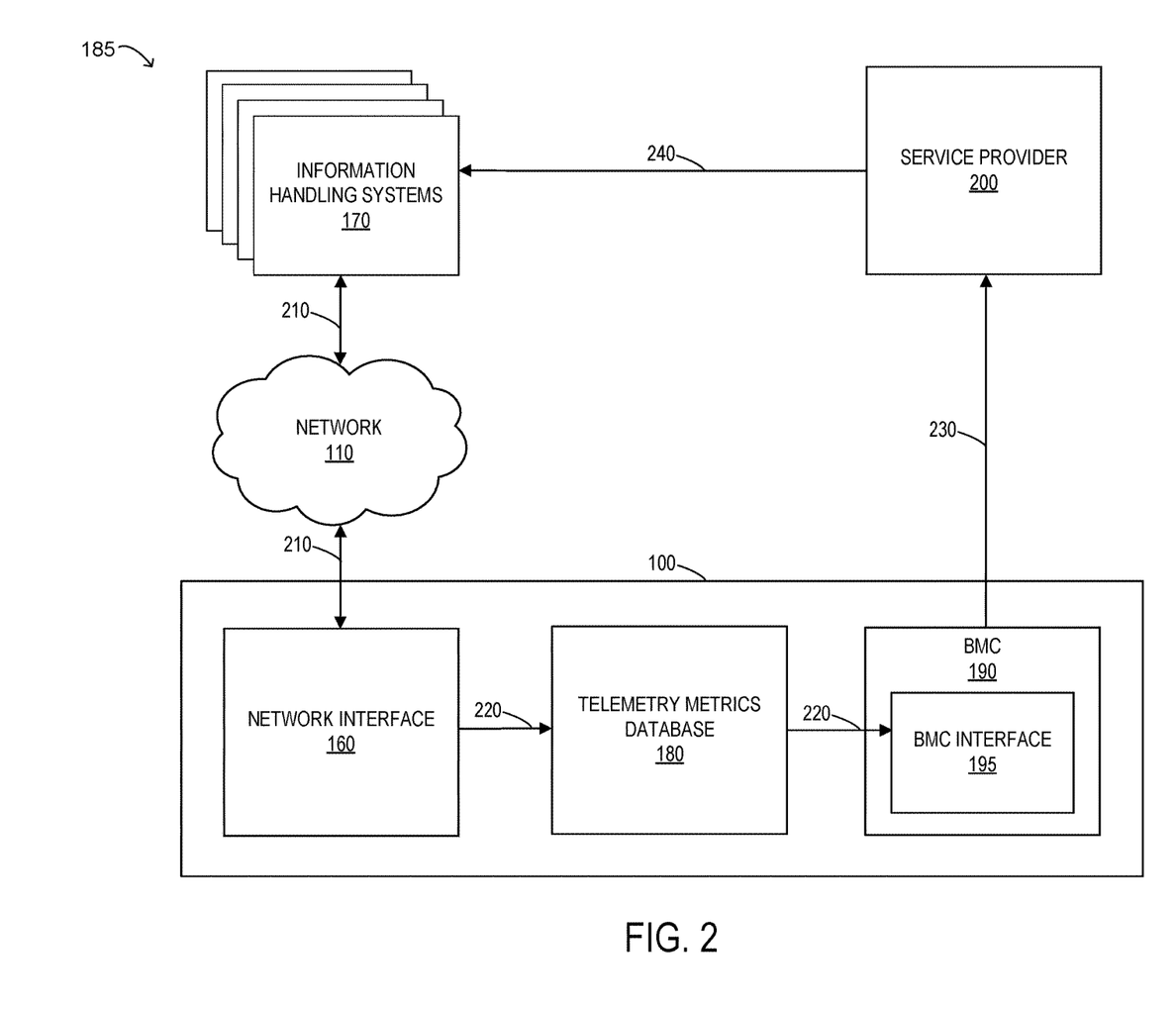
FIG. 2 illustrates a block diagram of selected elements of an embodiment of a computing system that includes information handling systems and a service provider.
Figure 3:
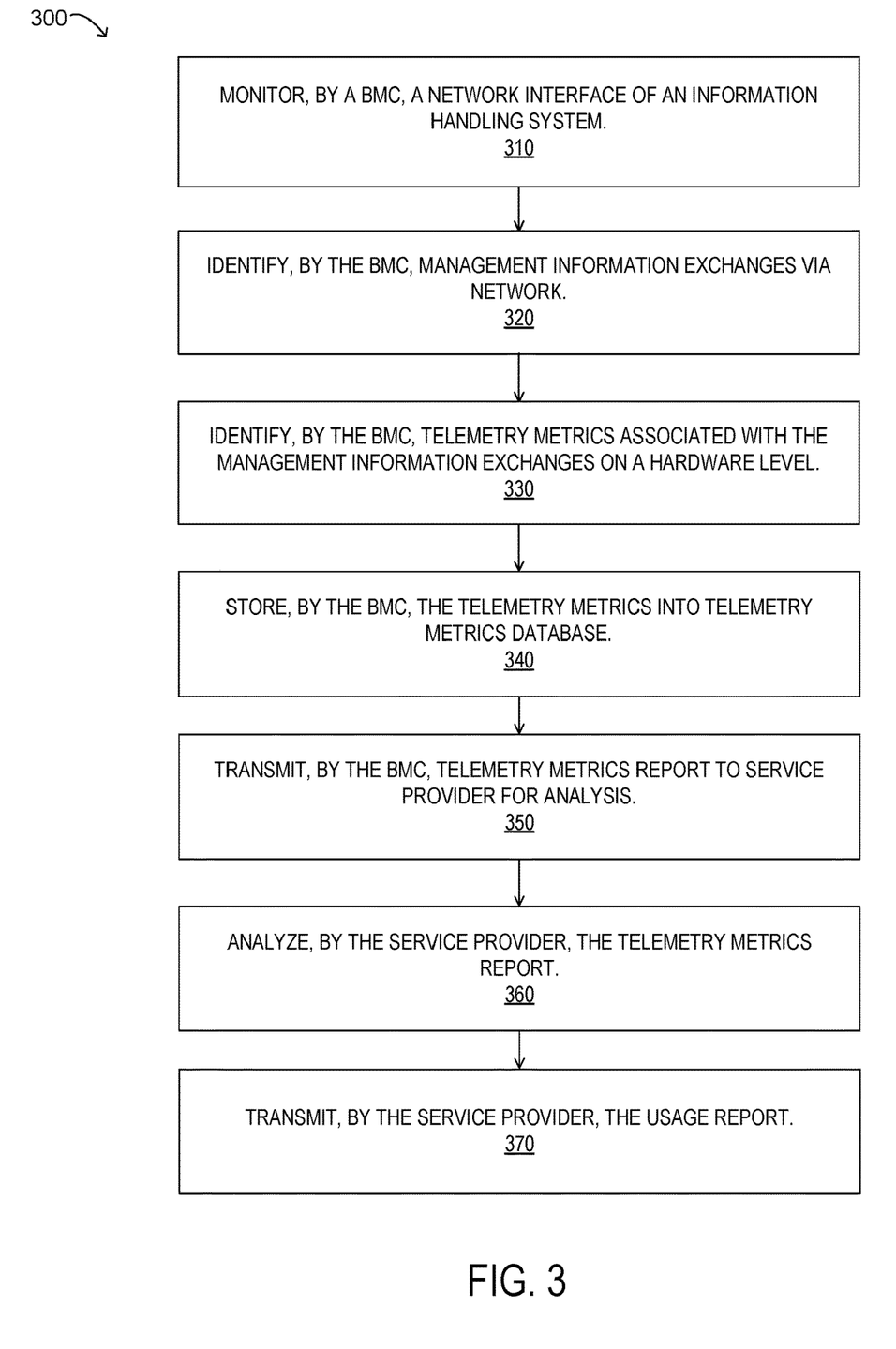
FIG. 3 illustrates a flowchart of selected elements of an embodiment of a method for monitoring usage of an information handling system using a baseboard management controller.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, a baseboard management controller (BMC) 190 that includes a BMC interface 195, a telemetry metrics database 180, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, Enhanced Serial Peripheral Interface (eSPI) bus, Hyper-Transport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely.

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In various embodiments, information handling systems 170 (individually referred to herein as "information handling system 170") may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling systems 170 may also represent other types of information handling systems, including desktop computers, server systems, controllers, and microcontroller units, among other types of information handling systems. In one embodiment, information handling systems 170 may represent one or more client devices within computing system 185. For example, information handling systems 170 may represent thousands of clients within a business enterprise that each communicate with information handling system 100 via network 110. Components of each information handling system 170 may include similar components to those described with respect to information handling system 100.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to information handling systems 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 170 and server information handling systems 100. A device (e.g., a client information handling system 170 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 170 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In one or more embodiments, information handling system 100 and information handling systems 170 may share a management information exchange (inband or remote) via network 110. In particular, the management information exchange may permit information handling system 100 and each information handling system 170 to exchange management information, such as "instrumentation data," associated with managed elements (e.g., such as one or more devices of information handling system 100) and/or may permit control and/or management of the managed elements. In addition, the management information exchange may include an interface of each information handling system 170 through which managed elements may provide information and/or notifications. In one embodiment, the management information exchange may include a Windows Management Interface (WMI) for ACPI (available from Microsoft Corporation). In another embodiment, the management information exchange may include a Common Information Model (CIM) (available via the Distributed Management Task Force) and communicate using a common manageability programming interface (CMPI) schema. In one or more embodiments, the management information exchange may include a combination of the CMPI and the CIM such that the CMPI may be utilized as an interface to the CIM. For example, the CMPI may be utilized to provide and/or send CIM object information, such as instrumentation data, to information handling systems 170.

In one embodiment, the management information exchange between information handling system 100 and each information handling system 170 via network 110 may produce one or more metrics associated with the management information exchange, or "telemetry metrics." Specifically, the management information exchange between information handling system 100 and information handling systems 170 may cause a number of bytes to be transmitted from information handling system 100 to information handling systems 170. Similarly, the management information exchange may cause a number of bytes to be received by information handling system 100 from information handling systems 170. In addition, the management information exchange between information handling system 100 and information handling systems 170 may cause a number of data packets to become lost while being transmitted and/or received. In one embodiment, these discarded data packets may be lost due to an electrical interference in network 110. The management information exchange between information handling system 100 and information handling systems 170 may also cause an overall power consumption of information handling system 100 to increase. Similarly, the management information exchange between information handling system 100 and information handling systems 170 may cause a number of bytes stored in information handling system 100 to increase. In one embodiment, these telemetry metrics may be collected by BMC 190 on a hardware level and stored in telemetry metrics database 180 of information handling system 100.

In one or more embodiments, BMC 190 may be or include a remote access controller. For example, the remote access controller may be or include a Dell Remote Access Controller (DRAC). In one or more embodiments, a remote access controller may be integrated into IHS 100. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more buses and/or one or more portions of information handling system 100. For example, the remote access controller may include and/or may provide power management, virtual media access, and/or remote console capabilities, among others, which may be available via a web browser and/or a command line interface. For instance, the remote access controller may provide and/or permit a user (e.g., an administrator) one or more abilities to configure and/or maintain an information handling system as if the administrator was at a console of the information handling system and/or had physical access to the information handling system.

In one or more embodiments, a remote access controller may interface with baseboard management controller integrated circuits. For example, each information handling system 170 may include a remote access controller used to interface with BMC 190 to perform a management information exchange with information handling system 100. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 190 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 190 may be or include an application processor. In one example, BMC 190 may be or include an ARM Cortex-A processor. In another example, BMC 190 may be or include an Intel Atom processor. In one or more embodiments, BMC 190 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

In one embodiment, BMC 190 may identify one or more telemetry metrics associated with management information exchanges between information handling system 100 and information handling systems 170. Specifically, BMC 190 may identify one or more telemetry metrics on a hardware level. Conventionally, a third-party and/or service provider may require a client to align with a third-party infrastructure (e.g., a cloud provider) to monitor usage of the client. Similarly, a third-party may require a client to deploy an agent at a virtual machine monitor (e.g., a hypervisor) level. However, virtual machines may be subject to malware attacks. For example, a malicious third-party may create malware and/or rootkits capable of being installed as a hypervisor below the operating system of a client to intercept operations of the operating system such as entering a password. In addition, third-party infrastructures such as virtual machines may increase the overall usage of system resources on a client. For example, a Type 2, or "hosted" hypervisor, may require a full copy of an operating system native to a client in addition to a virtual copy of all the hardware that the operating system requires to operate. This may result in increased random access memory (RAM) and/or central processing unit (CPU) cycles thereby increasing overall client usage metrics. In contrast, BMC 190 can identify telemetry metrics in a software-agnostic manner such that information handling system 100 does not require additional software (e.g., a hypervisor), virtual machines, and/or guest operating systems to monitor usage of information handling system 100. Identified telemetry metrics may be stored in telemetry metrics database 180. BMC 190 may transmit a telemetry metrics report that includes the telemetry metrics to a service provider (not shown in FIG. 1). The service provider may analyze the telemetry metrics report to determine an overall usage of information handling system 100. Monitoring usage is discussed further with respect to FIG. 2.

As depicted in FIG. 1, telemetry metrics database 180 may comprise a system, device, or apparatus operable to store telemetry metrics identified by BMC 190. In one embodiment, telemetry metrics database 180 may be comprised of a structured set of telemetry metrics associated with management information exchanges between information handling system 100 and information handling systems 170. These telemetry metrics may be used to determine an overall usage of information handling system 100. Specifically, the telemetry metrics stored in telemetry metrics database 180 may be compiled into a telemetry metrics report and transmitted to a service provider such that the telemetry metrics report may be analyzed. In one embodiment, BMC 190 may compile the telemetry metrics report in real-time as telemetry metrics are identified during a management information exchange. In another embodiment, BMC 190 may compile the telemetry metrics report on a scheduled basis (e.g., hourly, daily, weekly, monthly, and the like). In one embodiment, telemetry metrics database 180 may be or include a centralized database, distributed database, commercial database, operational database, relational database, and/or any other database management system suitable for storing telemetry metrics of information handling system 100.

In one or more embodiments, BMC interface 195 may include circuitry that enables communicatively coupling BMC 190 to one or more devices. In one example, BMC interface 195 may include circuitry that enables communicatively coupling BMC 190 to one or more buses. In a second example, BMC interface 195 may include circuitry that enables one or more interrupt signals to be received. In one instance, BMC interface 195 may include general purpose input/output (GPIO) circuitry, and the GPIO circuitry may enable one or more interrupt signals to be received and/or provided via at least one interrupt line. In another example, BMC interface 195 may include GPIO circuitry that enables BMC 190 to provide and/or receive signals associated with other circuitry (e.g., diagnostic circuitry). In a third example, BMC interface 195 may include circuitry that enables communicatively coupling to one or more networks, such as network 110. In one instance, BMC interface 195 may include circuitry that enables communicatively coupling to network interface 160. In another example, BMC interface 195 may include circuitry that enables BMC 190 to communicate with one or more entities within computing system 185 via Internet or other such architecture or system that facilitates the communication of signals, data, and/or messages. For example, BMC interface 195 may be communicatively coupled with a service provider via Internet.

FIG. 2 illustrates a block diagram of selected elements of an embodiment of a computing system that includes information handling systems and a service provider. In the embodiment illustrated in FIG. 2, each information handling system 170 may initiate a management information exchange 210 with information handling system 100 via network 110. In particular, information handling system 100 may communicate with each information handling system 170 via network interface 160. Each management information exchange 210 may be associated with one or more telemetry metrics 220. In one embodiment, BMC 190 may monitor one or more management information exchanges 210 between information handling system 100 and each information handling system 170 and can collect telemetry metrics 220 generated in response to the management information exchanges 210. For example, BMC 190 may monitor network interface 160 of information handling system 100 during management information exchanges 210.

In one embodiment, BMC 190 may identify one or more telemetry metrics 220 associated with the management information exchange in real-time while monitoring network interface 160. For example, BMC 190 may identify a number of bytes transmitted, a number of bytes received, and/or a number of input/output operations per second (IOPS) via network interface 160 during each management information exchange 210. In one instance, BMC 190 may determine a number of discarded data packets associated with the management information exchanges 210. That is, BMC 190 can determine a number of bytes transmitted and/or received, a number of IOPS, and a number of discarded data packets during management information exchanges 210 between information handling system 100 and each information handling system 170. In one embodiment, BMC 190 may use the number of bytes transmitted and/or received, the number of IOPS, and/or the number of discarded data packets, in part, to generate a telemetry metrics report in real-time. In another embodiment, these telemetry metrics 220 may be stored in telemetry metrics database 180 to be compiled into a telemetry metrics report at a later time.

In one embodiment, BMC 190 may identify one or more telemetry metrics at a time following management information exchanges 210 between information handling system 100 and each information handling system 170. For example, BMC 190 may identify an overall power consumption associated with each management information exchange 210. Specifically, BMC 190 may determine an overall power consumption of information handling system 100 required to execute one or more management information exchanges 210. In one instance, BMC 190 may identify one or more power metrics associated with information handling system 100 in response to one or more management information exchanges 210. For example, BMC 190 may identify an overall power consumption associated with a memory medium such as local storage resource 150 and/or memory subsystem 130. In another instance, BMC 190 may identify an overall power consumption associated with buses or other such communication systems used to transfer data between devices within information handling system 100. For example, BMC 190 may determine an overall power consumption of a Peripheral Component Interconnect Express (PCIe) bus used to facilitate the transport of data during each management information exchange 210. In yet another instance, BMC 190 may identify an overall power consumption associated with each device of information handling system 100. For example, BMC 190 may determine an overall power consumption associated with one or more fans used to cool information handling system 100 during management information exchanges 210. In another example, BMC 190 may determine a number of processors (e.g., comprising processor subsystem 120) within information handling system 100. BMC 190 may determine an overall power consumption associated with each processor executing command cycles during one or more management information exchanges 210. In one instance, BMC 190 may additionally identify a number of bytes stored in a memory medium associated with each management information exchange 210. For example, BMC 190 may determine a number of bytes stored in local storage resource 150 and/or memory subsystem 130 indicating a percent usage of an overall storage capacity of each memory medium. In one embodiment, BMC 190 may store each of these telemetry metrics 220 in telemetry metrics database 180 to be compiled into a telemetry metrics report.

In the embodiment illustrated in FIG. 2, BMC 190 may retrieve telemetry metrics 220 stored in telemetry metrics database 180 to compile a telemetry metrics report 230. In particular, BMC 190 may utilize BMC interface 195 to retrieve the telemetry metrics 220 stored in telemetry metrics database 180 and to transmit a telemetry metrics report 230 to service provider 200. In one embodiment, telemetry metrics report 230 may include each of the identified telemetry metrics 220 stored in telemetry metrics database 180. In other embodiments, telemetry metrics report 230 may include a subset of the telemetry metrics 220 stored in telemetry metrics database 180. For example, telemetry metrics report 230 may be comprised of telemetry metrics pertaining to an overall power consumption of each device of information handling system 100. In another example, telemetry metrics report 230 may be comprised of the number of bytes transmitted and/or received, the number of IOPS, and/or the number of discarded data packets identified during each management information exchange 210. In yet another example, telemetry metrics report 230 may be comprised of telemetry metrics 220 indicating a percent usage of an overall storage capacity of each memory medium of information handling system 100.

In one embodiment, BMC 190 may determine whether BMC interface 195 is communicatively coupled to service provider 200. For example, BMC 190 may determine if BMC interface 195 is communicatively coupled to service provider 200 via Internet such that service provider 200 may monitor usage of information handling system 100. In response to determining that BMC interface 195 is communicatively coupled to service provider 200, BMC 190 may transmit telemetry metrics report 230 to service provider 200 for analysis. However, in response to determining that BMC interface 195 is not communicatively coupled to service provider 200, BMC 190 may cause information handling system 100 to communicatively decouple from information handling systems 170 thereby terminating any management information exchanges 210 between information handling system 100 and each information handling system 170. In this way, BMC 190 may enforce one or more connection rules associated with service provider 200, ensuring that information handling system 100 may not be used in an environment where its usage may not be monitored by service provider 200.

In the embodiment illustrated in FIG. 2, service provider 200 may be a company, business enterprise, and/or billing entity operable for monitoring and supporting usage of information handling system 100. Specifically, service provider 200 may analyze one or more telemetry metrics reports 230 transmitted by BMC 190 to monitor usage of information handling system 100. In one embodiment, service provider 200 may analyze telemetry metrics 220 indicating an overall power consumption of each device of information handling system 100 to determine usage of information handling system 100. In another embodiment, service provider 200 may analyze telemetry metrics 220 indicating the number of bytes transmitted and/or received, the number of IOPS, and/or the number of discarded data packets identified during each management information exchange 210 to determine usage of information handling system 100. In yet another embodiment, service provider 200 may analyze telemetry metrics 220 indicating a percent usage of an overall storage capacity of each memory medium of information handling system 100 to determine usage of information handling system 100. In other embodiments, service provider 200 may analyze each of the telemetry metrics 200 included in telemetry metrics report 230 and/or any suitable combination of the embodiments described above to determine usage of information handling system 100.

In one embodiment, service provider 200 may determine whether a percent usage of the overall usage capacity of each device of information handling system 100 is above or below a reasonable percentage, or a "threshold percentage." Here, a threshold percentage of an overall usage capacity of a device may indicate a percent usage that is within a reasonable context of how the device is manufactured to be utilized. For example, a private business may employ an information handling system that includes a communications device having a bandwidth of 10 gigabits per second (Gbps). In this example, service provider 200 may identify the percent usage of the bandwidth for each management information exchange 210 that involves the 10 Gbps communication device utilizes 5% of the available bandwidth. In response to determining that the percent usage of a device is below the threshold percentage associated with the device, service provider 200 may identify one or more downgraded devices such that each downgraded device may have an overall usage capacity less than the overall usage capacity of the device below the threshold percentage currently in use. For example, service provider 200 may determine that the percent usage of the overall usage capacity of the 10 Gbps communications device is below the threshold percentage associated with the communications device and identify one or more downgraded devices having available bandwidths of 1 Gbps to more efficiently accommodate how the communications device is being utilized by the private business. Similarly, in response to determining that the percent usage of a device is above the threshold percentage associated with the device, service provider 200 may identify one or more upgraded devices such that each upgraded device may have an overall usage capacity greater than the overall usage capacity of the device above the threshold percentage. In one embodiment, service provider 200 may recommend the identified upgraded and/or downgraded devices to an administrator of information handling system 100. Specifically, service provider 200 may add information describing the upgraded and/or downgraded devices to a usage report 240 to be transmitted to information handling systems 170. In this way, service provider 200 may recommend ways in which management information exchanges between information handling system 100 and information handling systems 170 may be made more efficient and cost-effective.

In one embodiment, service provider 200 may determine a percent usage of each device of information handling system 100 and can identify whether each device is being utilized to a full capacity. In particular, service provider 200 may determine whether a percent usage of the overall usage capacity of a device of information handling system 100 is above a threshold percentage associated with the device. In addition to identifying one or more upgraded devices and adding information describing the upgraded devices to a usage report 240 as described above, service provider 200 may notify an administrator of information handling system 100 that the device is approaching use at a full capacity. Specifically, service provider 200 can transmit a notification to an administrator of information handling system 100 indicating that the percent usage of the overall usage capacity of the device is above the threshold percentage associated with the device. In one embodiment, this notification may be transmitted directly to an administrator via information handling systems 170 (e.g., via remote access controller). In another embodiment, the notification may be added to a usage report 240 to be transmitted to information handling systems 170. In this way, service provider 200 may ensure that the percent usage of the overall usage capacity for each device of information handling system 100 does not exceed full capacity.

In one embodiment, service provider 200 may use telemetry metrics 220 included in telemetry metrics reports 230 to suggest preventative maintenance for one or more devices of information handling system 100. In particular, service provider 200 may identify a trend in the percent usage of each device of information handling system 100 and can provide notification to an administrator of information handling system 100 indicating that the percent usage of the overall usage capacity may be approaching full capacity. For example, if a local storage medium of information handling system 100 has been frequently used for management information exchanges over the course of several years, service provider 200 can identify a trend of this heavy usage from telemetry metrics reports 230 spanning those years and can notify an administrator of information handling system 100 of the trend to prevent potential damage or wear to the local storage medium that may result in data loss. In this way, service provider 200 may ensure that each device of information handling system 100 may be monitored for performance and repaired and/or replaced before performance might become compromised.

In one embodiment, service provider 200 may use the telemetry metrics 220 included in telemetry metrics reports 230 for billing purposes. In particular, service provider 200 may determine usage of information handling system 100 based on telemetry metrics 220 and can charge an administrator and/or business enterprise a monetary amount based on the determined usage. Because telemetry metrics 220 may be monitored by BMC 190 on a hardware level, service provider 200 may determine usage of information handling system 100 in a software-agnostic manner that does not require additional software (e.g., a hypervisor), virtual machines, and/or guest operating systems to determine a billing amount. For example, service provider 200 may analyze telemetry metrics 220 indicating an overall power consumption associated with each device of information handling system 100 to determine a billing amount based on usage of information handling system 100. In another embodiment, service provider 200 may analyze telemetry metrics 220 indicating the number of bytes transmitted and/or received, the number of IOPS, and/or the number of discarded data packets identified during each management information exchange 210 to determine a billing amount based on usage of information handling system 100. In yet another embodiment, service provider 200 may analyze telemetry metrics 220 indicating a percent usage of an overall storage capacity of each memory medium within information handling system 100 to determine a billing amount based on usage of information handling system 100. In other embodiments, service provider 200 may analyze each of the telemetry metrics 200 included in telemetry metrics report 230 and/or any suitable combination of the embodiments described above to determine a billing amount based on usage of information handling system 100.

In one embodiment, different weights may be applied to telemetry metrics 220 to determine a billing amount. For example, telemetry metrics 220 indicating an overall power consumption of each device of information handling system 100 may be weighted more heavily than telemetry metrics 220 indicating a percent usage of an overall storage capacity of each memory medium within information handling system 100. In one embodiment, service provider 200 may determine different weights applied to telemetry metrics 220 based on identified trends in the percent usage of each device of information handling system 100 as indicated in telemetry metrics reports 230. In another embodiment, different weights may be applied to telemetry metrics 220 based on respective overall usage capacity for each device. In other embodiments, service provider 200 may apply different weights to telemetry metrics 220 based on any suitable combination of the embodiments described above.

In one embodiment, service provider 200 may compile a usage report 240 based on the analysis of telemetry metrics report 230. In particular, service provider 200 may compile a usage report 240 indicating a usage of information handling system 100 to an administrator of information handling system 100. In one embodiment, a usage report 240 may include a percent usage of the overall usage capacity of each device of information handling system 100. In another embodiment, a usage report 240 may include information describing upgraded and/or downgraded devices based on a percent usage of the overall usage capacity for each device of information handling system 100. In another embodiment, a usage report 240 may include suggestions regarding preventative maintenance for devices of information handling system 100. In another embodiment, a usage report 240 may include a bill based on usage of information handling system 100 as indicated by telemetry metrics 220 monitored by BMC 190. In other embodiments, usage report 240 may include any suitable combination of the embodiments described above.

FIG. 3 illustrates a flowchart of selected elements of an embodiment of a method for monitoring usage of an information handling system using a baseboard management controller. It is noted that certain operations described in method 500 may be optional or may be rearranged in different embodiments.

In the method 300 illustrated in FIG. 3, a baseboard management controller (BMC) 190 can monitor 310 a network interface 160 of information handling system 100. The network interface 160 may be communicatively coupled to information handling systems 170. BMC 190 can identify 320 one or more management information exchanges 210 between information handling system 100 and information handling systems 170 via network 110. BMC 190 can identify 330 one or more telemetry metrics 220 associated with the one or more management information exchanges 210. Specifically, BMC 190 can identify the one or more telemetry metrics 220 on a hardware level in a software-agnostic manner. BMC 190 can store 340 the one or more telemetry metrics 220 into telemetry metrics database 180 and can transmit 350 a telemetry metrics report 230 to service provider 200 for analysis. Telemetry metrics report 230 may include at least the one or more telemetry metrics 220 stored in telemetry metrics database 180. Upon receiving the telemetry metrics report 230, service provider 200 may analyze 360 the telemetry metrics report 230 that indicates a percent usage of an overall usage capacity associated with each device of a plurality of devices of information handling system 100. Service provider 200 may transmit 370 a usage report 240 to information handling systems 170, or an administrator thereof, based on the analysis of the telemetry metrics report 240.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    monitoring, by a baseboard management controller (BMC) of an information handling system, a network interface of the information handling system, the network interface communicatively coupled to a plurality of information handling systems via a network;
    identifying, by the BMC and via the network interface, one or more management information exchanges between the information handling system and each of the plurality of information handling systems via the network;
    identifying, by the BMC, one or more telemetry metrics associated with the one or more management information exchanges, the BMC identifying the one or more telemetry metrics on a hardware level in a software-agnostic manner;
    storing, by the BMC, the one or more telemetry metrics into a telemetry metrics database of the information handling system;
    transmitting, by the BMC, a telemetry metrics report to a service provider for analysis, the telemetry metrics report comprised of at least the one or more telemetry metrics;
    analyzing, by the service provider, the telemetry metrics report, the analysis indicating a percent usage of an overall usage capacity associated with each device of a plurality of devices of the information handling system;
    transmitting, by the service provider, a usage report to the plurality of information handling systems, the usage report based on the analysis of the telemetry metrics report;
    determining that a BMC interface is not communicatively coupled to the service provider, and in response, causing, by the BMC, the information handling system and each of the plurality of information handling systems to communicatively decouple.

2. The method of claim 1, wherein identifying the one or more telemetry metrics comprises:
    determining, by the BMC, at least one of:
        a number of bytes transmitted from the information handling system to each of the plurality of information handling systems via the network interface during the one or more management information exchanges; and
        a number of bytes received by the information handling system from each of the plurality of information handling systems via the network interface during the one or more management information exchanges.

3. The method of claim 1, wherein identifying the one or more telemetry metrics comprises:
    determining, by the BMC, a number of discarded data packets associated with the one or more management information exchanges, the number of discarded data packets indicating a number of data packets lost due to an electrical interference in the network.

4. The method of claim 1, wherein identifying the one or more telemetry metrics comprises:
    determining, by the BMC, an overall power consumption of the information handling system, the overall power consumption associated with the one or more management information exchanges.

5. The method of claim 1, wherein identifying the one or more telemetry metrics comprises:
    determining, by the BMC, a number of bytes stored in a local storage resource of the information handling system, the number of bytes stored indicating a percentage of an overall storage capacity of the local storage resource that have been used for storage.

6. The method of claim 1, wherein identifying the one or more telemetry metrics comprises:
determining, by the BMC, a number of processors comprising a processor subsystem of the information handling system, each processor executing a command cycle.

7. The method of claim 1, wherein analyzing the telemetry metrics report comprises:
determining, by the service provider, whether the percent usage of the overall usage capacity associated with each device of the plurality of devices of the information handling system is below a threshold percentage; and
in response to determining that the percent usage of the overall usage capacity associated with a device of the plurality of devices is below the threshold percentage:
identifying, by the service provider, a plurality of downgraded devices, each downgraded device having an overall usage capacity less than the overall usage capacity associated with the device of the plurality of devices; and
adding, by the service provider, information describing the plurality of downgraded devices to the usage report.

8. The method of claim 1, wherein analyzing the telemetry metrics report comprises:
determining, by the service provider, whether the percent usage of the overall usage capacity associated with each device of the plurality of devices of the information handling system is above a threshold percentage; and
in response to determining that the percent usage of the overall usage capacity associated with a device of the plurality of devices is above the threshold percentage:
identifying, by the service provider, a plurality of upgraded devices, each upgraded device having an overall usage capacity greater than the overall usage capacity associated with the device of the plurality of devices; and
adding, by the service provider, information describing the plurality of upgraded devices to the usage report.

9. The method of claim 8, further comprising:
transmitting, by the service provider, a notification to an administrator of the information handling system, the notification indicating that the percent usage of the overall usage capacity of the device is above the threshold percentage.

10. A computing system, comprising:
an information handling system;
a plurality of information handling systems;
a base board management controller (BMC) of the information handling system, the BMC configured to:
monitor a network interface of the information handling system, the network interface communicatively coupled to each of the plurality of information handling systems via a network;
identify one or more management information exchanges between the information handling system and each of the plurality of information handling systems via the network;
identify one or more telemetry metrics associated with the one or more management information exchanges, the BMC identifying the one or more telemetry metrics on a hardware level in a software-agnostic manner;
store the one or more telemetry metrics into a telemetry metrics database of the information handling system; and
transmit a telemetry metrics report to a service provider for analysis, the telemetry metrics report comprised of at least the one or more telemetry metrics; and
the service provider configured to:
analyze the telemetry metrics report, the analysis indicating a percent usage of an overall usage capacity associated with each device of a plurality of devices of the information handling system;
transmit a usage report to the plurality of information handling systems, the usage report based on the analysis of the telemetry metrics report,
determining that a BMC interface is not communicatively coupled to the service provider, and in response, causing, by the BMC, the information handling system and each of the plurality of information handling systems to communicatively decouple.

11. The computing system of claim 10, wherein to identify the one or more telemetry metrics, the BMC is configured to:
determine at least one of:
a number of bytes transmitted from the information handling system to each of the plurality of information handling systems via the network interface during the one or more management information exchanges; and
a number of bytes received by the information handling system from each of the plurality of information handling systems via the network interface during the one or more management information exchanges.

12. The computing system of claim 10, wherein to identify the one or more telemetry metrics, the BMC is configured to:
determine a number of discarded data packets associated with the one or more management information exchanges, the number of discarded data packets indicating a number of data packets lost due to an electrical interference in the network.

13. The computing system of claim 10, wherein to identify the one or more telemetry metrics, the BMC is configured to:
determine an overall power consumption of the information handling system, the overall power consumption associated with the one or more management information exchanges.

14. The computing system of claim 10, wherein to identify the one or more telemetry metrics, the BMC is configured to:
determine a number of bytes stored in a local storage resource of the information handling system, the number of bytes stored indicating a percentage of an overall storage capacity of the local storage resource that have been used for storage.

15. The computing system of claim 10, wherein to identify the one or more telemetry metrics, the BMC is configured to:
determine a number of processors comprising a processor subsystem of the information handling system, each processor executing a command cycle.

16. The computing system of claim 10, wherein to analyze the telemetry metrics report, the service provider is configured to:

determine whether the percent usage of the overall usage capacity associated with each device of the plurality of devices of the information handling system is below a threshold percentage; and in response to determining that the percent usage of the overall usage capacity associated with a device of a plurality of devices is below the threshold percentage:
- identify a plurality of downgraded devices, each downgraded device having an overall usage capacity less than the overall usage capacity associated with the device of the plurality of devices; and
- add information describing the plurality of downgraded devices to the usage report.

17. The computing system of claim 10, wherein to analyze the telemetry metrics report, the service provider is configured to:

determine whether the percent usage of the overall usage capacity associated with each device of the plurality of devices of the information handling system is above a threshold percentage; and in response to determining that the percent usage of the overall usage capacity associated with a device of the plurality of devices is above the threshold percentage:
- identify a plurality of upgraded devices, each upgraded device having an overall usage capacity greater than the overall usage capacity associated with the device of the plurality of devices; and
- add information describing the plurality of upgraded devices to the usage report.

18. The computing system of claim 17, wherein to analyze the telemetry metrics report, the service provider is further configured to:

transmit, by the service provider, a notification to an administrator of the information handling system, the notification indicating that the percent usage of the overall usage capacity of the device is above the threshold percentage.

* * * * *